United States Patent
Yoon et al.

(10) Patent No.: US 7,233,440 B2
(45) Date of Patent: Jun. 19, 2007

(54) IMAGE DISPLAY SCREEN HAVING WIDE VERTICAL AND HORIZONTAL VIEWING ANGLES AND PROJECTION TELEVISION INCLUDING THE SAME

(75) Inventors: Seok-il Yoon, Maetropolitan (KR); Sung-gi Kim, Suwon-si (KR); Gyu-hwan Hwang, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 79 days.

(21) Appl. No.: 10/874,700

(22) Filed: Jun. 24, 2004

(65) Prior Publication Data

US 2005/0018286 A1    Jan. 27, 2005

(30) Foreign Application Priority Data

Jun. 24, 2003    (KR)    ............... 10-2003-0041053

(51) Int. Cl.
- *G03B 21/60* (2006.01)
- *G03B 21/56* (2006.01)
- *G02B 27/10* (2006.01)
- *H04N 9/31* (2006.01)

(52) U.S. Cl. ............. 359/457; 359/619; 359/453; 359/460; 348/744

(58) Field of Classification Search .......... 359/457, 359/619, 453–455, 460; 348/744

See application file for complete search history.

(56) References Cited

U.S. PATENT DOCUMENTS

| | | | | |
|---|---|---|---|---|
| 3,523,717 A | * | 8/1970 | Glenn, Jr. | .......... 359/449 |
| 5,581,407 A | * | 12/1996 | Mitani et al. | .......... 359/619 |
| 5,724,182 A | * | 3/1998 | Mitani et al. | .......... 359/457 |
| 5,880,887 A | * | 3/1999 | Goto | .......... 359/626 |
| 6,307,675 B1 | * | 10/2001 | Abe et al. | .......... 359/457 |
| 6,421,181 B1 | | 7/2002 | Yoshida et al. | |
| 6,859,314 B2 | * | 2/2005 | Yoon et al. | .......... 359/452 |
| 2004/0246578 A1 | * | 12/2004 | Shikama et al. | .......... 359/457 |
| 2005/0117212 A1 | * | 6/2005 | Kumagai et al. | .......... 359/457 |

FOREIGN PATENT DOCUMENTS

| | | |
|---|---|---|
| JP | 7-128744 A | 5/1995 |
| KR | 96-015507 B1 | 11/1996 |
| KR | 2000-0015228 A | 3/2000 |

* cited by examiner

*Primary Examiner*—W. B. Perkey
*Assistant Examiner*—Magda Cruz
(74) *Attorney, Agent, or Firm*—Sughrue Mion, PLLC (57) ABSTRACT

Provided is an image display screen having wide horizontal and vertical viewing angles and a projection television including the same. The image display screen includes a Fresnel screen, a first lenticular screen that widens a horizontal viewing angle and a second lenticular screen including a first portion that widens a vertical viewing angle and a second portion that prevents degradation of contrast due to external light, and a protective screen. The second lenticular screen and the protective screen can be replaced by an integrated screen or a composite screen having the characteristics of both. In addition, a pattern may be formed on the rear surface of the Fresnel screen to perform the same function as the first portion.

14 Claims, 10 Drawing Sheets

IMAGE DISPLAY SCREEN HAVING WIDE VERTICAL AND HORIZONTAL VIEWING ANGLES AND PROJECTION TELEVISION INCLUDING THE SAME

BACKGROUND OF THE INVENTION

This application claims the priority of Korean Patent Application No. 2003-41053, filed on Jun. 24, 2003, in the Korean Intellectual Property Office, the disclosure of which is incorporated herein in its entirety by reference.

1. Field of the Invention

The present invention relates to an image display screen and an image display medium including the image display screen, and more particularly, to a screen on which an image is projected and a projection television including the same.

2. Description of the Related Art

An image projection system such as a projection television and a video projector is an image display system, which generates an image using a specially manufactured image display medium such as a small CRT, an LCD, and a PDLC, magnifies the image using a projection lens, and projects the magnified image on a large screen. The image projection system has an advantage of being able to accommodate a large screen. Consumers prefer large screens and the demand for image projection systems is growing.

Image projection systems may be divided into front projection systems and rear projection systems depending on how an image is magnified and projected on a screen. An image projection system projects a light beam emitted from a light source toward a screen to form an image on the screen such that a viewer in front of the screen can recognize the image. Preferably, a viewer is centered in front of the screen. However, the viewer may not be centered in front of the screen and the screen may be above or below eye level. Therefore, image projection systems must have a wide viewing angle.

Figure 1:
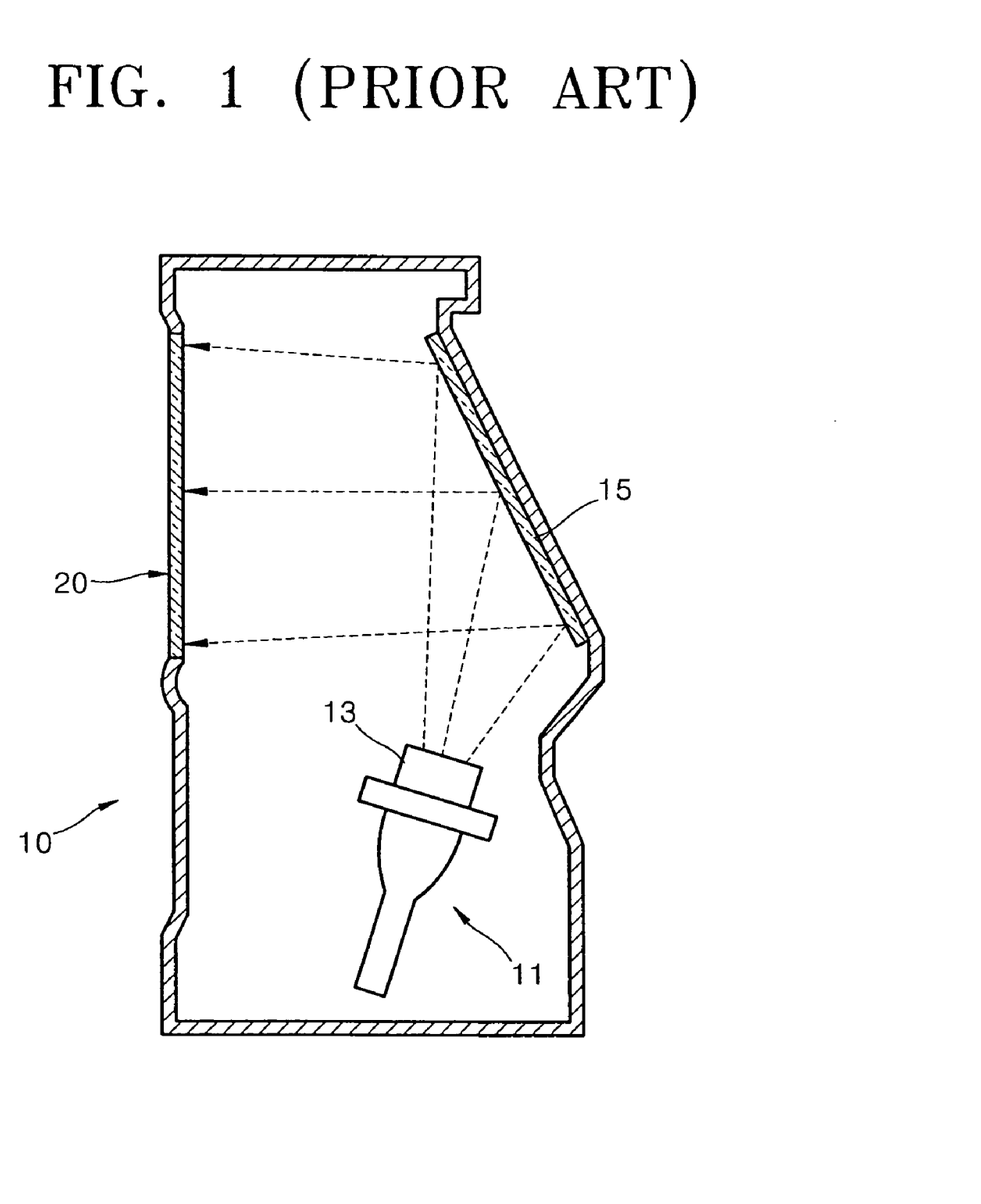
FIG. 1 is a schematic view of a conventional projection television.

FIG. 1 is a schematic view of a conventional projection television. Referring to FIG. 1, a conventional projection television includes a cabinet 10, a screen 20, an image forming medium 11, a projection lens unit 13, and a reflector 15. The screen 20 is installed on the front surface of the cabinet 10, and an image is formed thereon. The image forming medium 11, which may include CRTs and may be located inside the cabinet 10, forms an image and irradiates the image toward the reflector 15. The projection lens unit 13 magnifies the image irradiated from the image forming medium 11. The reflector 15 reflects the image toward the screen 20.

An image is projected on the rear surface of the screen 20, and a viewer, in front of the screen 20, watches the image projected on the screen.

Figure 2:
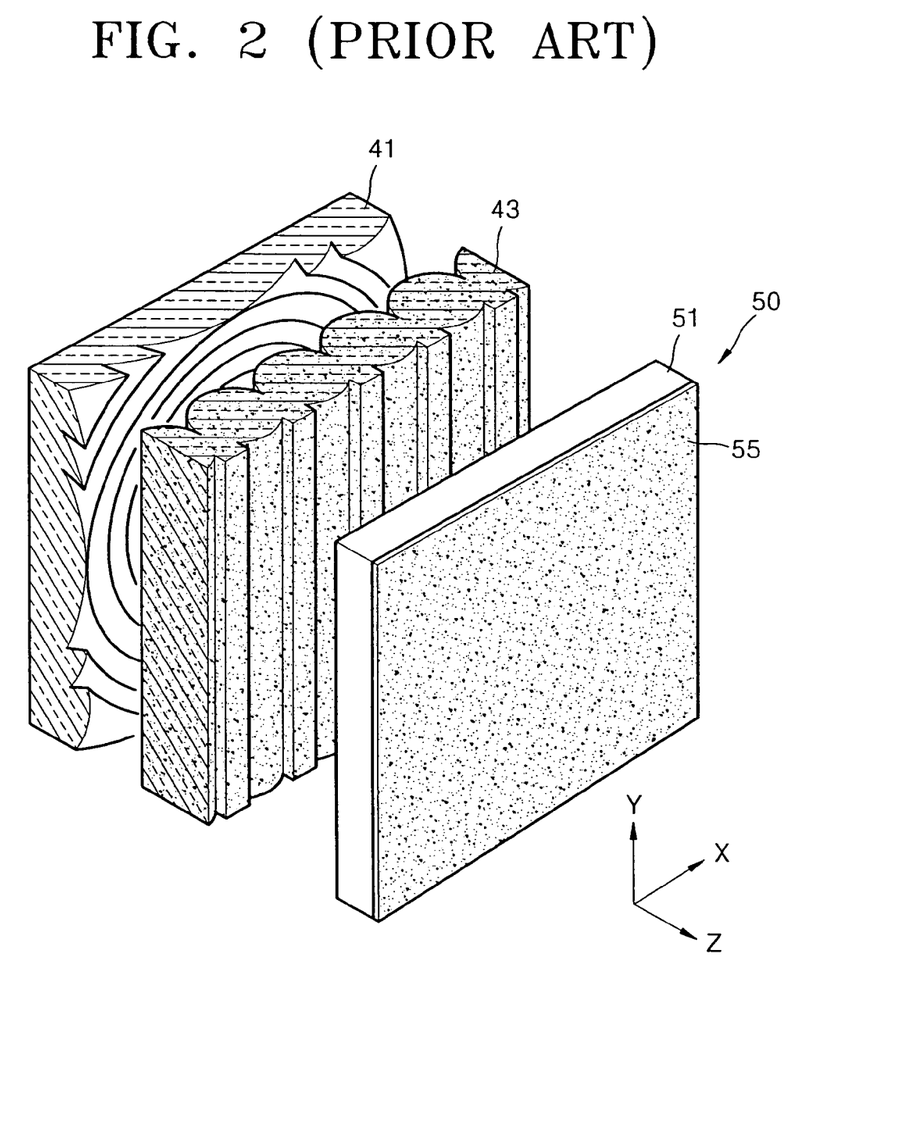
FIG. 2 is an exploded perspective view of a screen of the conventional projection television of FIG. 1.

FIG. 2 is an exploded perspective view of a screen of the conventional projection television of FIG. 1.

Referring to FIGS. 1 and 2, the screen 20 includes a Fresnel screen 41, a first lenticular screen 43, and a protective screen 50. The Fresnel screen 41 refracts a light beam reflected by the reflector 15 to collimate the light beam. The first lenticular screen 43 disposed in front of the Fresnel screen 41 widens an image passed through the Fresnel screen 41 in a horizontal direction, thereby widening a horizontal viewing angle. The protective screen 50 is disposed in front of the first lenticular screen 43 and protects the Fresnel screen 41 and the first lenticular screen 43.

The protective screen 50 includes a first substrate sheet 51 protecting the first lenticular screen 43 and an external light reflection reducer 55 attached to the front surface of the first substrate sheet 51. The external light reflection reducer 55 prevents an external light beam emitted from a light source such as a fluorescent lamp from being reflected at the surface of the first substrate sheet 51.

The screen of the conventional projection television of FIG. 2 may provide a wide horizontal viewing angle using the first lenticular screen 43, but provides a very narrow vertical viewing angle.

Figure 3:
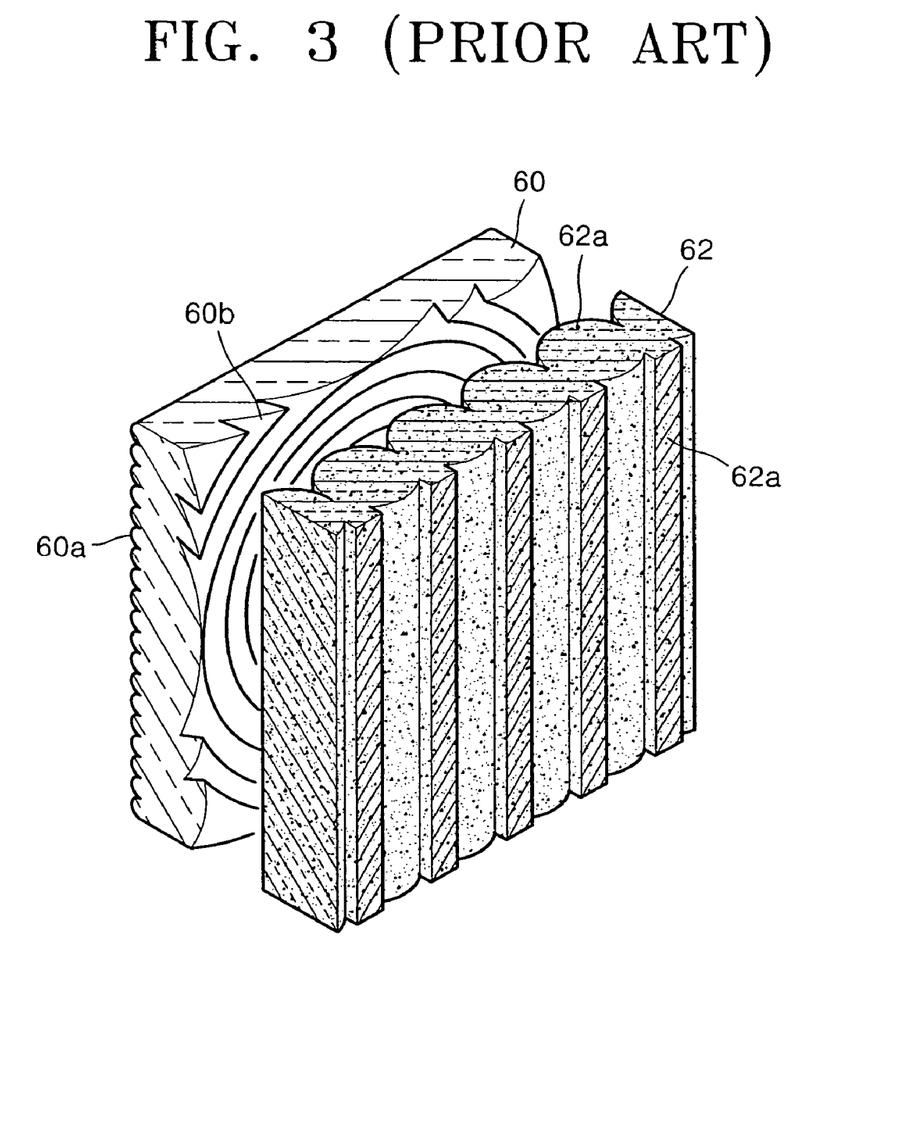
FIG. 3 is an exploded perspective view of a screen of another conventional projection television.

To solve this problem, another conventional screen is suggested in FIG. 3. Japanese Patent Laid-open Publication No. 2000-137293 (published on May 16, 2000), entitled "Transmission screen" provides a conventional screen that solves this problem.

FIG. 3 is an exploded perspective view of the screen disclosed in this publication. Referring to FIG. 3, the screen includes a Fresnel screen 60, and a lenticular screen 62. The lenticular screen 62 of FIG. 3 is identical to the first lenticular screen 43 of FIG. 2. The lenticular screen 62 includes black stripes on a lens shaped incident surface. The Fresnel screen 60 of FIG. 3 is different from the Fresnel screen 41 of FIG. 2.

Specifically, an incident surface 60a of the Fresnel screen 60 has bumps extending horizontally and parallel to one another. Each of the bumps looks like a convex lens. The bumps are perpendicular to cylindrical lenses formed on the incident surface 62a of the lenticular screen 62.

Therefore, a light beam incident on the incident surface 60a of the Fresnel screen 60 of FIG. 3 is spread more widely in a vertical direction than a light beam incident on an incident surface of the Fresnel screen 41 of FIG. 2. In other words, the screen of FIG. 3 has a much wider vertical viewing angle than the screen of FIG. 2. However, the screen of FIG. 3 still has a limited vertical viewing angle for the following reason.

To have a vertical viewing angle as large as a horizontal viewing angle, each of the bumps formed on the incident surface 60a of the Fresnel screen 60 of FIG. 3 needs to have a large curvature. However, it is difficult to increase the curvature of each of the bumps in consideration of the structure of the screen of FIG. 3. Therefore, the vertical viewing angle is limited. As an alternative, power may be increased. However, in this case, a diffused light beam is incident on the Fresnel screen 60, resulting in a degradation of resolution and forming of multiple images. Therefore, watching the screen itself becomes difficult.

Figure 4:
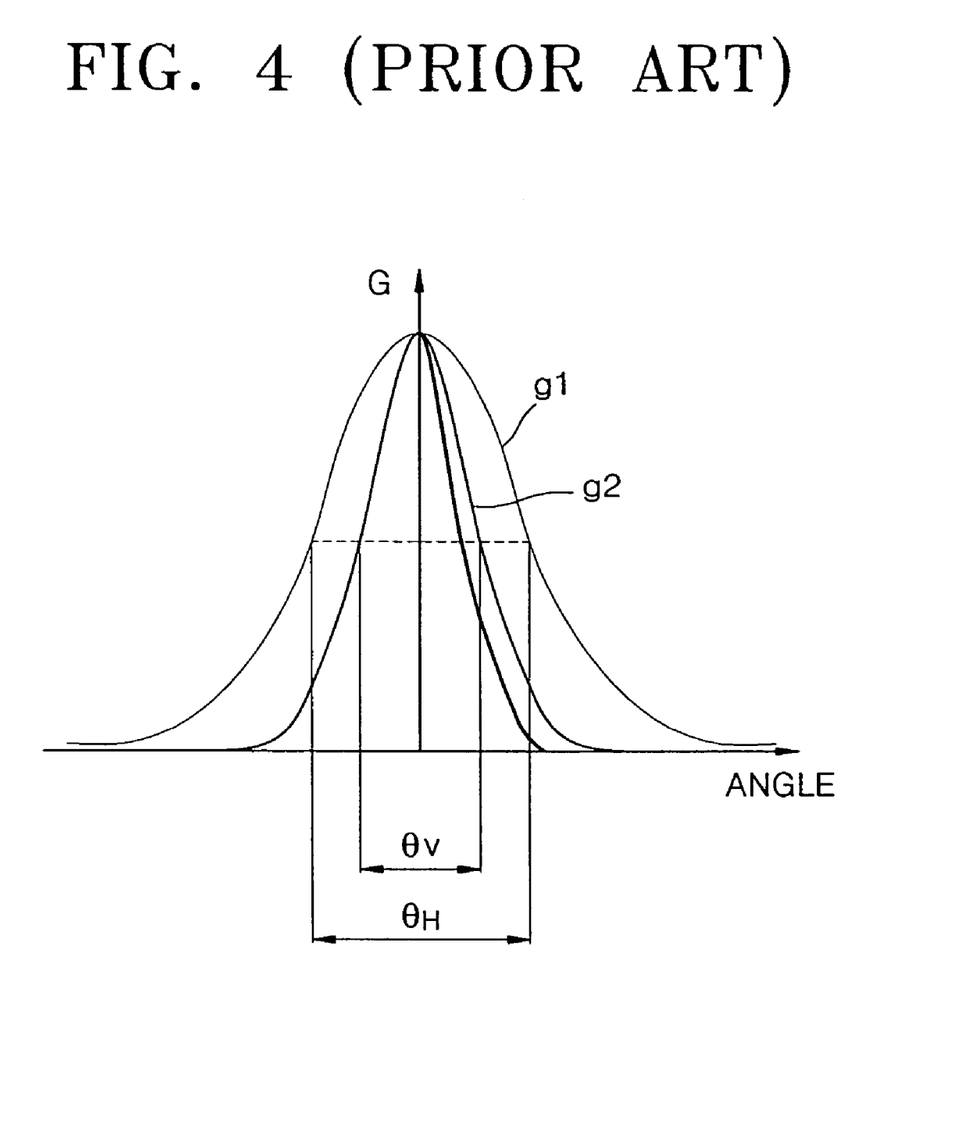
FIG. 4 is a graph illustrating luminosity with respect to vertical and horizontal angles when the screen of FIG. 3 is included in the projection television of FIG. 1.

FIG. 4 is a graph illustrating vertical and horizontal angles of light after passing through the conventional screen of FIG. 3. A first graph g1 illustrates luminosity with respect to a horizontal viewing angle, a second graph g2 illustrates luminosity with respect to a vertical viewing angle. Referring to the first and second graphs g1 and g2, a vertical viewing angle $\theta_V$ is much smaller than a horizontal viewing angle $\theta_H$.

SUMMARY OF THE INVENTION

The present invention provides an image display screen with wide horizontal and vertical viewing angles and having a high contrast ratio. The present invention also provides a projection television including the screen.

According to an aspect of the present invention, there is provided an image display screen including a Fresnel screen, a first lenticular screen for widening a horizontal viewing angle, and a second lenticular screen including a first portion for widening a vertical viewing angle and a second portion for preventing degradation of contrast due to external light.

The second lenticular screen and the protective screen are separated by a predetermined distance. The second portion has the same shape as the rear surface of the first portion.

The first portion is a substrate sheet comprising a plurality of cylindrical lenses, each having a predetermined curvature, formed side by side in a horizontal direction on the rear surface of the substrate facing the second portion. The second portion is a tinted light absorbing sheet.

According to another aspect of the present invention, there is provided an image display screen including a Fresnel screen, a lenticular screen for widening a horizontal viewing angle of a light beam passing through the Fresnel screen, and a multifunctional screen disposed in front of the lenticular screen. The multifunctional screen includes a substrate sheet, on the rear surface of which a predetermined pattern is formed to widen a vertical viewing angle of a light beam passing through the lenticular screen; a first portion attached to the rear surface of the substrate sheet and preventing degradation of contrast due to an external light beam; and a second portion attached to the front surface of the substrate sheet and preventing scattering of the external light beam.

A plurality of cylindrical lenses, each having a predetermined curvature, are formed side by side in a horizontal direction on the rear surface of the substrate sheet. The first portion is a tinted light absorbing sheet. The second portion is a reflection preventing film coated on the front surface of the substrate sheet.

According to yet another aspect of the present invention, there is provided a projection television including a screen on which an image formed by an image forming device is projected. The screen includes a Fresnel screen, a first lenticular screen widening a horizontal viewing angle, and a second lenticular screen comprising a first portion widening a vertical viewing angle and a second portion preventing degradation of contrast due to external light.

The second lenticular screen and the protective screen are adhered to one another by an adhesive sheet. The second portion has the same shape as the rear surface of the first portion. The first portion is a substrate sheet including a plurality of cylindrical lenses, each having a predetermined curvature, formed side by side in a horizontal direction on the rear surface of the substrate facing the second portion.

According to still yet another aspect of the present invention, there is provided a projection television including a screen on which an image formed by an image forming device is projected. The screen includes a Fresnel screen, a lenticular screen widening a horizontal viewing angle, and a multifunctional screen disposed in front of the lenticular screen.

The multifunctional screen includes a substrate sheet, on the rear surface of which a predetermined pattern is formed to widen a vertical viewing angle of a light beam passing through the lenticular screen; a first portion attached to the rear surface of the substrate sheet and preventing degradation of contrast due to an external light beam; and a second portion attached to the front surface of the substrate sheet and preventing scattering of the external light beam.

A plurality of cylindrical lenses, each having a predetermined curvature, formed side by side in a horizontal direction on the back surface of the substrate sheet. The first portion is a tinted light absorbing sheet. The second portion is a reflection preventing film coated on the front surface of the substrate sheet.

The present invention provides wider horizontal and vertical viewing angles, and higher contrast ratio and resolution than conventional screens.

BRIEF DESCRIPTION OF THE DRAWINGS

The above and other features and advantages of the present invention will become more apparent by describing in detail exemplary embodiments thereof with reference to the attached drawings in which:

FIG. 7 is used.

DETAILED DESCRIPTION OF THE INVENTION

The present invention will now be described more fully with reference to the accompanying drawings, in which exemplary embodiment of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art. In the drawings, the thickness of layers and regions are exaggerated for clarity. Like reference numerals in the drawings denote like elements, and thus duplicate descriptions will be omitted.

Figure 5:
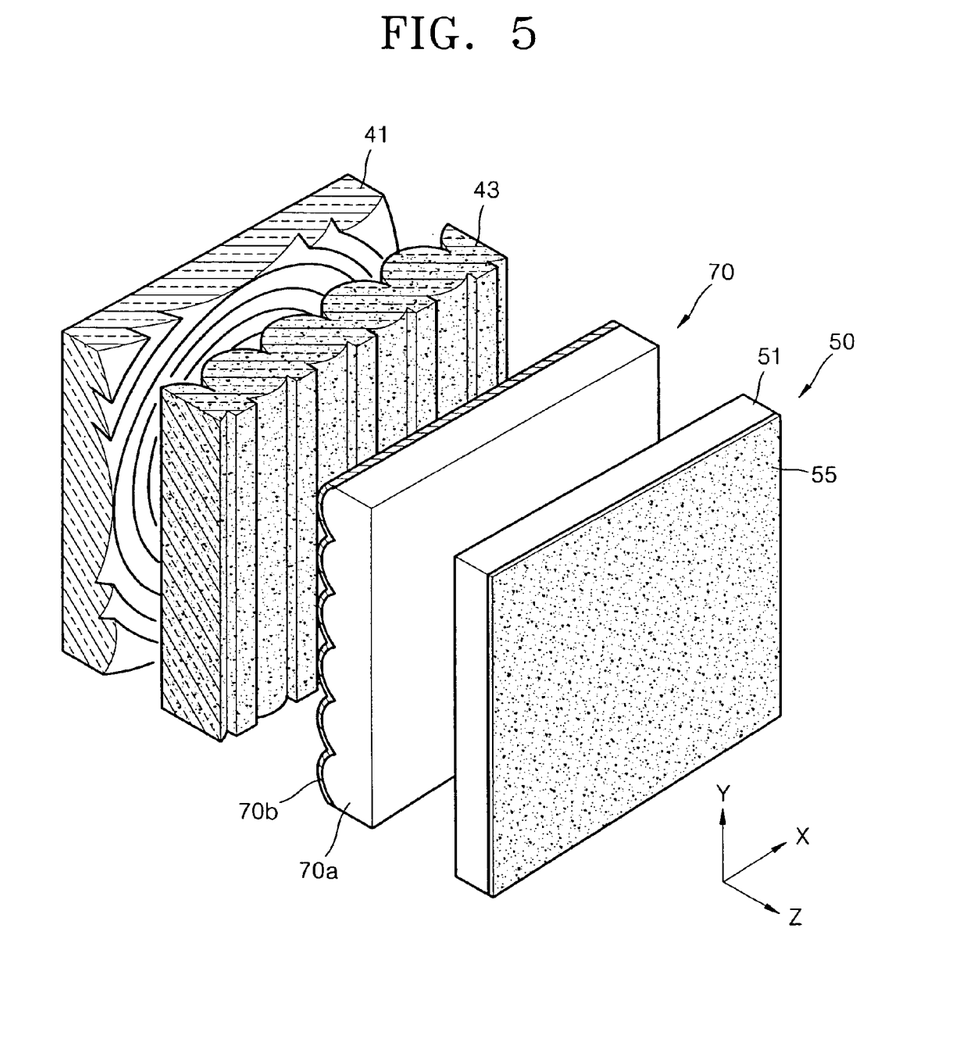
FIG. 5 is an exploded perspective view illustrating an image display screen according to an embodiment of the present invention.

FIG. 5 is an exploded perspective view of an image display screen according to an embodiment of the present invention. Referring to FIG. 5, the image display screen includes a Fresnel screen 41, a first lenticular screen 43, a second lenticular screen 70, and a protective screen 50 arranged sequentially. The Fresnel screen 41 collimates an incident light beam, which is incident on the first lenticular screen 43. A Fresnel ridge is formed on the front surface of the Fresnel screen 41. The Fresnel ridge is formed to a polymethyl methacrylate (PMMA) plate using a ultraviolet hardened resin and has a predetermined pitch. The Fresnel screen 41 can form multiple focuses and control viewing distance.

Although not shown in the drawing, a plurality of patterns for widening a vertical viewing angle may be formed, in a predetermined shape, on the rear surface of the Fresnel screen 41. The plurality of patterns may be identical, and each of the patterns may, for example, be a horizontally disposed cylindrical lens.

The first lenticular screen 43 disposed in front of the Fresnel screen 41 spreads the light beam emitted from the Fresnel screen 41 in a horizontal direction, thereby widening a horizontal viewing angle. Since the first lenticular screen 43 includes a plurality of vertically formed cylindrical lenses on its incident and exit surfaces, the first lenticular screen 43 not only has a wide horizontal viewing angle, but also minimizes a color shift.

The second lenticular screen 70 disposed in front of the first lenticular screen 43 widens a vertical viewing angle of the light beam having its horizontal viewing angle widened by the first lenticular screen 43. To widen the vertical viewing angle of the light beam, the second lenticular screen 70 includes a transparent substrate 70a and a first external light absorbing sheet 70b attached to the rear surface of the second substrate 70a.

A plurality of bumps, all having the same shape, extending in the horizontal direction may be formed on the rear surface of the second substrate sheet 70a. The bumps widen a vertical viewing angle of the light beam that passed through the first lenticular screen 43. In other words, the bumps are perpendicular to the cylindrical lenses formed vertically on the rear surface of the first lenticular screen 43. Each of the bumps formed on the rear surface of the second substrate sheet 70a may be a cylindrical lens having a predetermined curvature such that all light incident from the protective screen 50 is reflected.

The thickness of the first external light absorbing sheet 70b attached to the rear surface of the second substrate sheet 70a is uniform, and the outer surface of the first external light absorbing sheet 70b is shaped like the rear surface of the second substrate sheet 70a. The first external light absorbing sheet 70b prevents degradation of the contrast of the screen due to an external light beam incident from an external source. Therefore, the first external light absorbing sheet 70b may be tinted to minimize external reflection by appropriately absorbing the external light beam. The first external light absorbing sheet 70b can maximize a contrast ratio of the screen due to sunlight and minimize degradation of luminosity. The first external light absorbing sheet 70b may be composed of an optical resin having a high light transmission coefficient such as PET, PC, or PMMA or an alloy of PET, PC, or PMMA.

Meanwhile, the second lenticular screen 70 may be formed in a variety of ways. For example, a double extruding method or a method using an ultraviolet-hardened resin may be used. In the double extruding method, the second substrate sheet 70a and the first external light absorbing sheet 70b are simultaneously extruded and attached to one another. In the extruding process, only the first external light absorbing sheet 70b is tinted.

When using the ultraviolet-hardened resin, the cylindrical lenses on the rear surface of the second substrate 70a are formed of the ultraviolet-hardened resin. In this case, only a portion of the rear surface of the second substrate sheet 70a on which the cylindrical lenses are formed is tinted in a concentrated manner.

In this method, it is easy to control optical characteristics of the front and the rear surfaces of the second lenticular screen 70. Hence, it is possible to configure a variety of screens having desired luminance and contrast ratios.

The protective screen 50 is disposed in front of the second lenticular screen 70 and protects the screen and prevents static electricity, external scratches, and scattered reflection of an external light beam. The protective screen 50 includes a first substrate sheet 51 and a first reflection preventive film 55 coated on the front surface of the first substrate sheet 51.

The protective screen 50 and the second lenticular screen 70 may be integrated or adhered to one another using an adhesive sheet.

Figure 6:
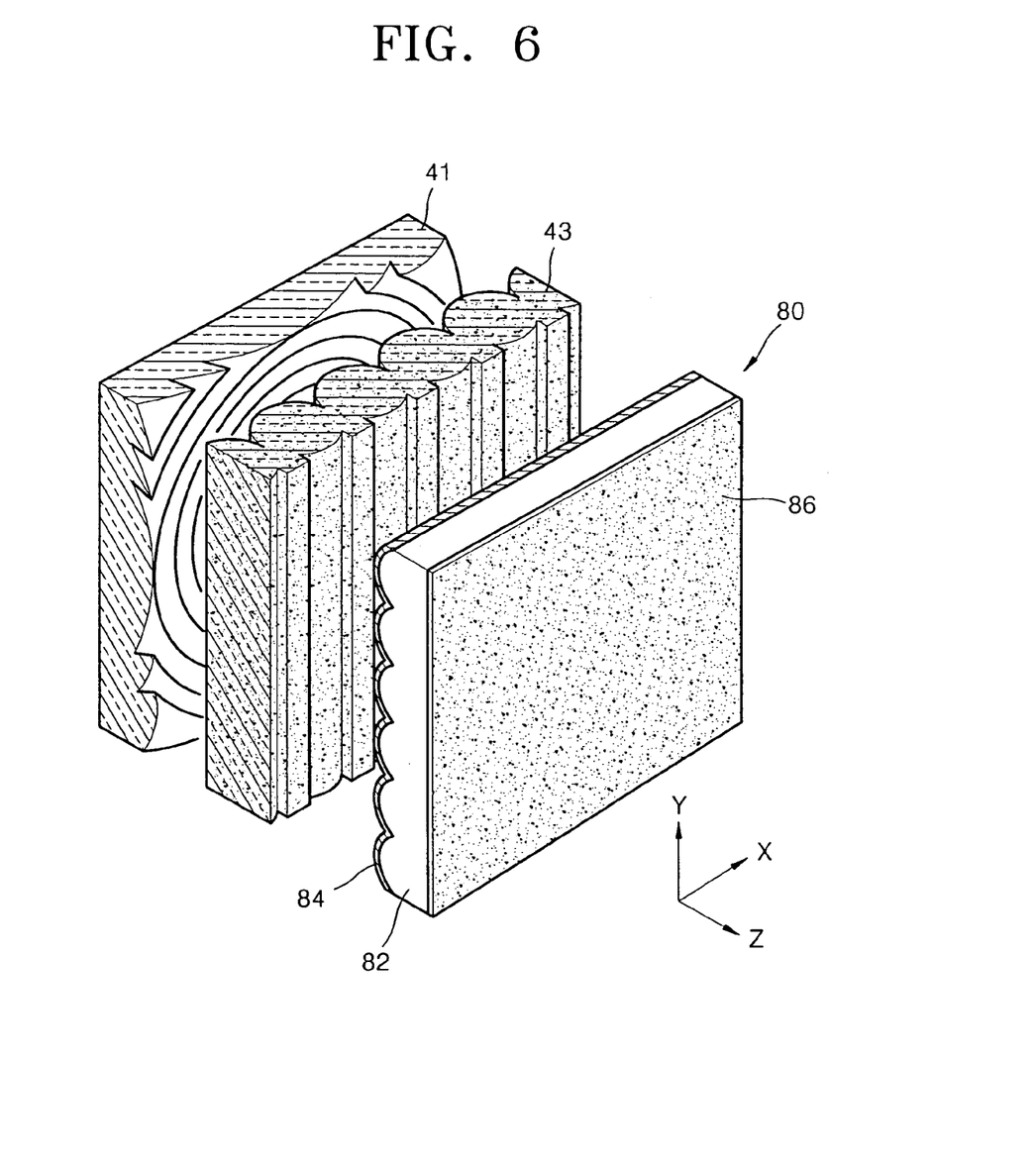
FIG. 6 is a perspective view of the screen of FIG. 5 in which a second lenticular screen and a protective screen are integrated.
Figure 7:
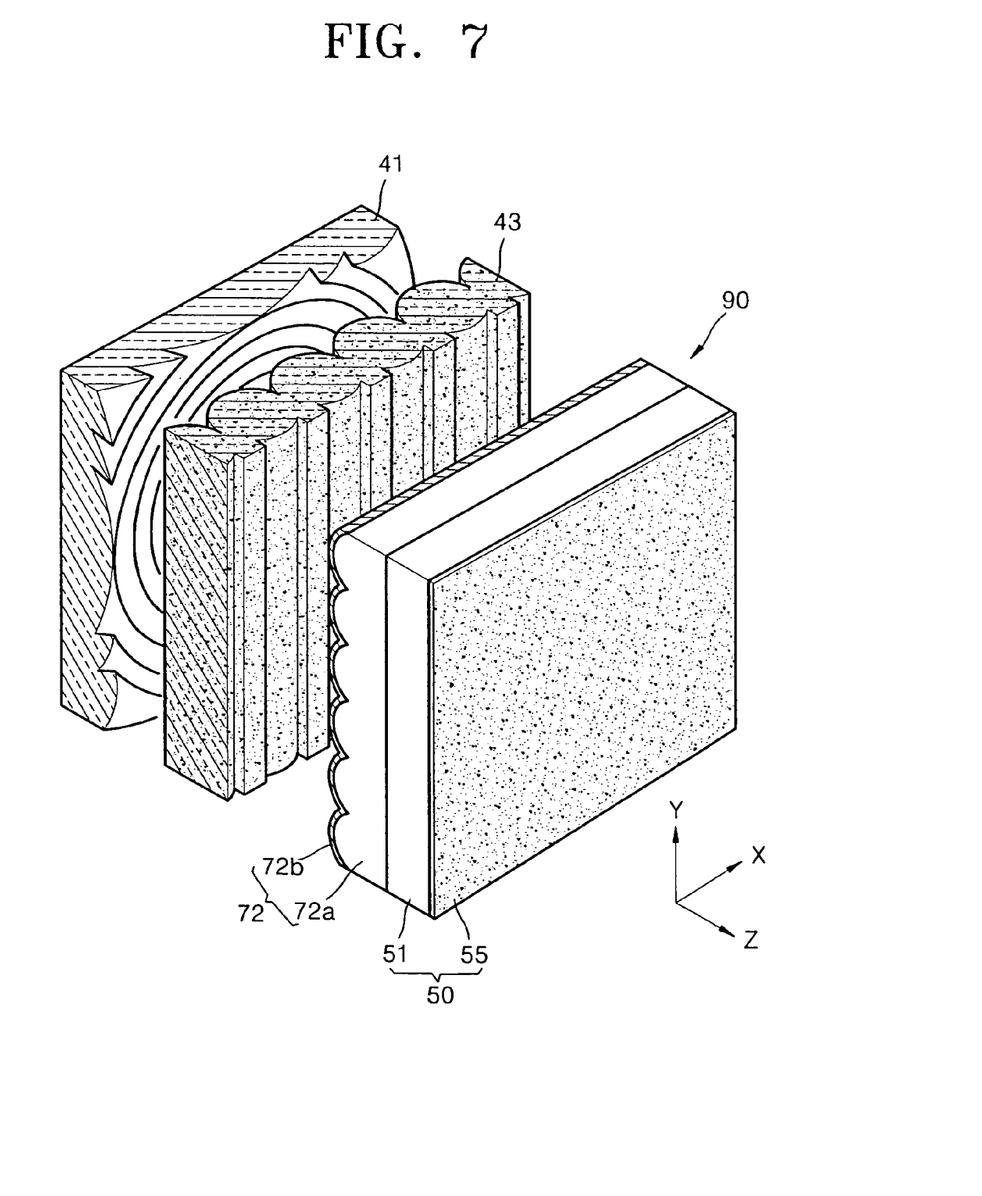
FIG. 7 is a perspective view of the screen of FIG. 5 in which the second lenticular screen and the protective screen are adhered to one another.

FIG. 6 illustrates the screen of FIG. 5 when the protective screen 50 and the second lenticular screen 70 are integrated. FIG. 7 shows the screen of FIG. 5 when the protective screen 50 and the second lenticular screen 70 are adhered to one another.

Referring to FIG. 6, when the protective screen 50 and the second lenticular screen 70 are integrated, the screen includes a Fresnel screen 41, a first lenticular screen 43, and a multifunctional screen 80. The multifunctional screen 80 performs the functions of the second lenticular screen 70 and the protective screen 50 of FIG. 5. In other words, the multifunctional screen 80 protects screen elements behind the multifunctional screen 80 and prevents scattered reflection of an external light beam at the surface of the screen. To perform these functions, the multifunctional screen 80 includes a second reflection preventive film 86 attached to the front surface of a third substrate 82 and a second external light absorbing sheet 84 covering the rear surface of the third substrate 82 having a plurality of cylindrical lenses extending in the horizontal direction and formed side by side in the vertical direction. The second reflection preventive film 86 is equivalent to the first reflection preventive film 55 of FIG. 5.

Referring to FIG. 7, the protective screen 50 and the second lenticular screen 72 are adhered to one another. Further, the screen includes a Fresnel screen 41, a first lenticular screen 43, and a composite screen 90. The composite screen 90 is formed by adhering the second lenticular screen 72 to the protective screen 50 of FIG. 5 using an adhesive sheet (not shown). A detailed description of each screen will be omitted since each screen has already been described earlier.

As the second lenticular screen 72 and the protective screen 50 are adhered, the resultant has rigid state. Accordingly, a light beam is not refracted or transformed. Further, since minute creases are not formed on a light diffusing film, it is possible to provide clear images.

Figure 8:
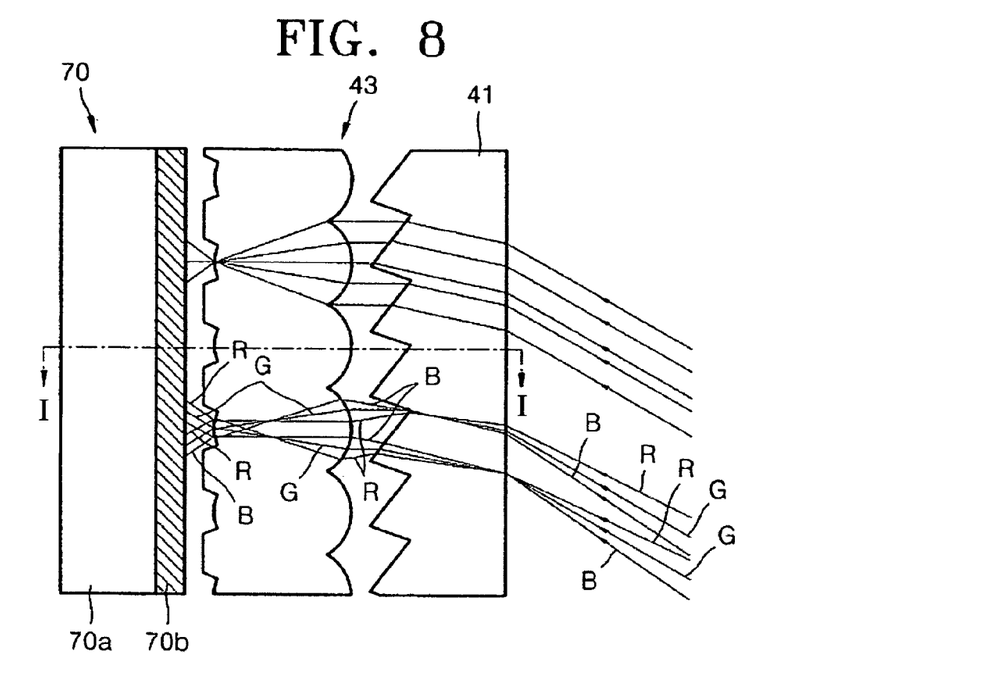
FIG. 8 is a plan view of the screen of FIG. 5.

FIG. 8 is a plan view of the screen of FIG. 5. For the sake of convenience, the protective screen 50 of FIG. 5 is not shown. Referring to FIG. 8, red, green, and blue (RGB) proceed parallel to one another and are incident on the rear surface of the first lenticular screen 43. When exiting the first lenticular screen 43, the RGB light beams are dispersed in a horizontal direction according to the refractive index of the first lenticular screen 43 and the curvature of the front and rear surfaces of the first lenticular screen 43. In other words, the RGB light beams that pass through the first lenticular screen 43 have a wide horizontal viewing angle.

Figure 9:
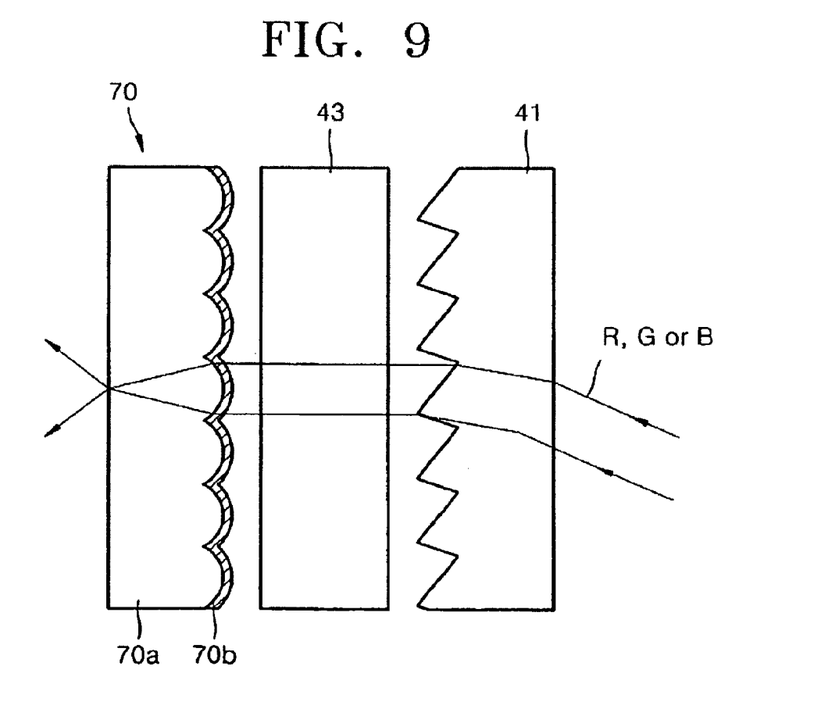
FIG. 9 is a cross section of the screen taken along a line I—I of FIG. 8.

FIG. 9 is a cross section of the screen taken along a line I—I of FIG. 8. Referring to FIG. 9, the RGB light beams that sequentially pass through the Fresnel screen 41 and the first lenticular screen 43 are dispersed in a vertical direction when passing through the second lenticular screen 70. Thus, the second lenticular screen 70 significantly widens a vertical viewing angle of a light beam.

Figure 10:
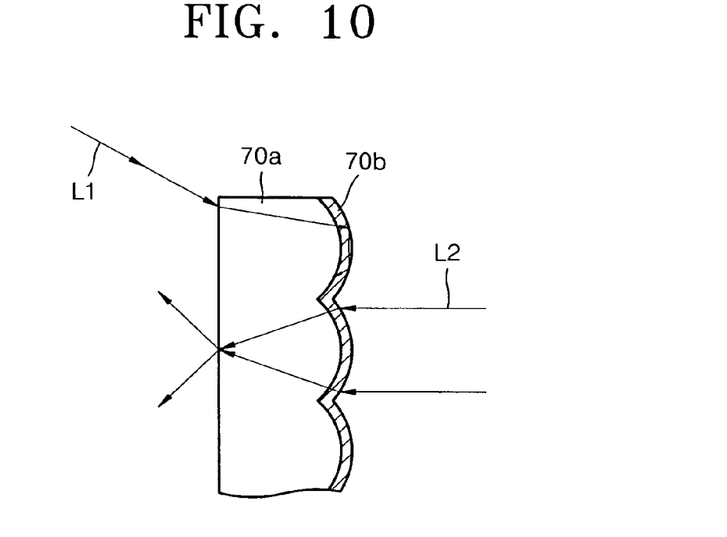
FIG. 10 is a cross section illustrating the operation of the second lenticular screen of FIG. 5.

FIG. 10 illustrates the operation of the second lenticular screen 70 of FIG. 9. Referring to FIG. 10, a first light beam L1 is incident from an external source and a second light beam L2, incident from the first lenticular screen 43, is horizontally dispersed when passing through the first lenticular screen 43.

The first light beam L1 incident on the front surface of the second substrate 70a, passes through the second substrate 70a and is incident on the first external light absorbing sheet 70b. As described above, cylindrical lenses having a predetermined curvature are formed on the rear surface of the second substrate 70a such that total internal reflection of the first light beam L1 incident on the front surface can occur. The first external light absorbing sheet 70b attached to the entire rear surface of the second substrate 70a forms cylindrical lenses having the same curvature as the cylindrical lenses formed on the rear surface of the second substrate 70a. The first light beam L1 is completely reflected at an outer surface of the first external light absorbing sheet 70b and proceeds inside the first external light absorbing sheet 70b. Then, the first light beam L1 is again completely reflected at another portion of the outer surface of the first external absorbing sheet 70b and proceeds toward the second substrate 70a. In this process, most of the first light beam L1 is absorbed by the first external light absorbing sheet 70b. Accordingly, most of the first light beam L1 incident to the first external light absorbing sheet 70b through the second substrate 70a is not reflected toward the second substrate 70a. Although the first beam L1 is reflected toward the second substrate 70a, the reflected amount of the first light beam L1 is negligible. Therefore, the affect of the first light beam L1 on the second light beam L2 is negligible.

Meanwhile, the second light beam L2 is incident on the second substrate 70a through the first external light absorbing sheet 70b. Therefore, part of the second light beam L2 is also absorbed by the first external light beam absorbing sheet 70b.

However, referring to FIG. 10, when passing through the first external light absorbing sheet 70b, the second light beam L2 travels a shorter distance through the first external light absorbing sheet 70b than the first light beam L1. Therefore, the amount of the second light beam L2 absorbed by the first external absorbing sheet 70b is very low. Hence, the effects of the first external light absorbing sheet 70b on the second light beam L2 are negligible.

In other words, the first external absorbing sheet 70b does not affect an image formed by the second light beam L2, which is generated by an image forming medium such as a CRT. However, the first external absorbing sheet 70b does absorb most of the first light beam L1, that is, a light beam incident from an external source. Therefore, the screen of a projection television including the second lenticular screen 70 to which the first external light absorbing sheet 70b is attached has a greater contrast ratio and is brighter than conventional screens.

An experiment conducted using the screen according to the embodiment of the present invention will now be described. In the experiment, the screen of FIG. 6 including the multifunctional screen 80 in which the second lenticular screen 70 is integrated into the protective screen 50 was used. A pitch of the pattern of the Fresnel screen 41 was 0.068 mm, and a pitch of the cylindrical lenses formed on the rear surface of the first lenticular screen 43 was 0.52 mm. A percentage of the front surface of the first lenticular screen 43 covered by the black stripes was 45 percent. A pitch of the cylindrical lenses formed on the rear surface of the multifunctional screen 80 was 0.155 mm. The conventional screen of FIG. 2 was also used for comparison.

Table 1 shows factors of the screen elements of FIG. 6 used in the experiment.

TABLE 1

| | Category | | |
|---|---|---|---|
| | Pitch (mm) | Black stripe rate | Others (material, shape, tint, etc) |
| Fresnel Screen | 0.068 | | PMMA plate +UV curbing |
| First Lenticular Screen | 0.52 | 45% | PMMA |
| Multifunctional Screen | 0.155 | | PMMA plate, tinted lens unit, reflection preventing film |

Figure 11:
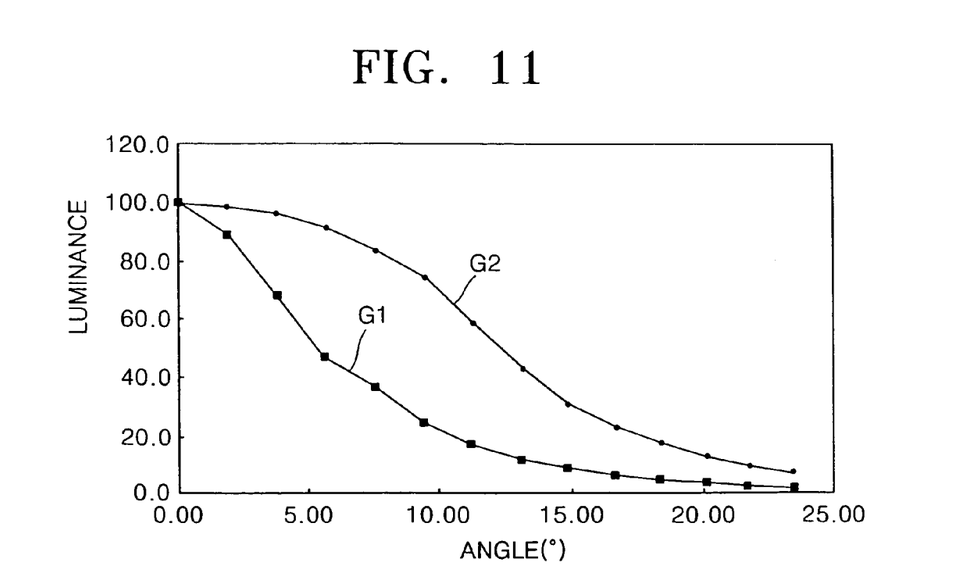
FIG. 11 is a graph illustrating a vertical distribution of light when the conventional screen of FIG. 2 is used, and when the image display screen of FIG. 5, FIG. 6.

The results of the experiment are illustrated in FIG. 11. FIG. 11 illustrates luminosity with respect to a vertical viewing angle. A first graph G1 illustrates luminosity of the conventional screen of FIG. 2, and a second graph G2 illustrates luminosity of the screen of FIG. 6.

Referring to the first and the second graphs G1 and G2 of FIG. 11, the screen according to an embodiment of the present invention can secure a sufficient luminosity across a wide vertical viewing angle. However, the conventional screen of FIG. 2 has a much narrower vertical viewing angle that can secure sufficient luminosity than the screen according to an embodiment of the present invention.

In this regard, when using the projection television including the screen according to an embodiment of the present invention, a viewer can properly watch the projection television at relatively wide, horizontal and vertical angles.

Figure 12:
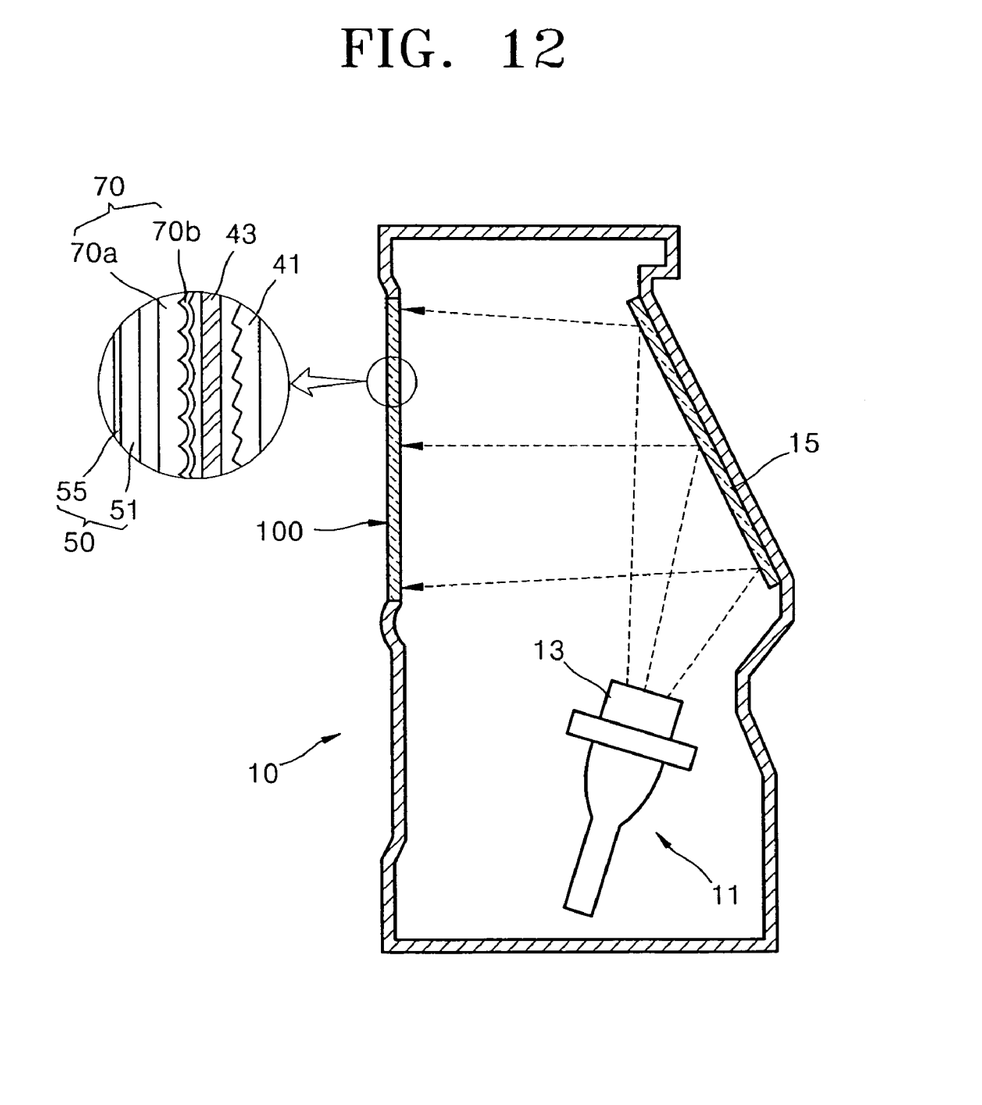
FIG. 12 is a cross sectional view of a projection television including the image display screen of FIG. 5 according to an embodiment of the present invention.

FIG. 12 is a schematic view of a projection television including the screen according to an embodiment of the present invention. Referring to FIG. 12, the projection television includes a screen 100. A circle to the left is an enlarged view of a portion of the screen 100. Referring to the circle, it can be seen that the screen 100 is identical to the screen of FIG. 5. The screen 100 of the projection television of the present invention may be identical to the screen of FIG. 5. However, the screen 100 may also be identical to the screen of FIG. 6 or 7. The projection television includes a case 10, an image forming device 11, a projection lens unit 13, and a reflector 15.

As described above, a screen according to an embodiment of the present invention includes a first lenticular screen for widening a horizontal viewing angle and a second lenticular screen disposed in front of the first lenticular screen and widening a vertical viewing angle. A plurality of cylindrical lenses, each having a predetermined curvature, extending in a horizontal direction and vertical direction, are formed on the rear surface of the second lenticular screen. An external light absorbing sheet having a unitform thickness covers the rear surface of the second lenticular screen and has the same curvature as the cylindrical lenses.

In this regard, the screen may have wide horizontal and vertical viewing angles due to the first and the second lenticular screens. In addition, the external light absorbing sheet included in the second lenticular screen absorbs most of the external light beam incident from an external source. Therefore, the screen may have a higher contrast ratio and luminosity than conventional screens.

While the present invention has been particularly shown and described with reference to exemplary embodiments thereof, it will be understood by those of ordinary skill in the art that various changes in form and details may be made therein without departing from the spirit and scope of the present invention as defined by the appended claims. For example, a person skilled in the art can add a light diffuser to substrates of the first lenticular screen and/or the second lenticular screen. In addition, a small heat transmitter or a cooler may be connected to the screen to eliminate heat generated by the external light absorbing sheet. Further, the external light absorbing sheet may selectively cover only a portion of the rear surface of the second lenticular screen, and the pitch or the curvature of the plurality of the cylindrical lenses formed on the rear surface of the second lenticular screen may not be identical.

What is claimed is:

1. An image display screen comprising:
   a Fresnel screen;
   a lenticular screen comprising, a first lenticular screen that widens a horizontal viewing angle and a second lenticular screen comprising a first portion that widens a vertical viewing angle and a second portion that prevents degradation of contrast due to external light; and
   a protective screen;
   wherein a light emitting surface of the second lenticular screen and the protective screen are adhered to one another by an adhesive sheet;
   wherein the second portion has the same shape as a rear surface of the first portion; and
   wherein the second portion is a tinted light absorbing sheet which is adhered to a light incident surface of the second lenticular screen facing the first lenticular screen.

2. The image display screen of claim 1, wherein the first portion is a substrate sheet comprising a plurality of cylindrical lenses, each lens having a predetermined curvature, formed side by side in a horizontal direction on a rear surface of the substrate facing the second portion.

3. The image display screen of claim 1, wherein a plurality of cylindrical lenses, each lens having a predetermined curvature, are formed side by side in a horizontal direction on a rear surface of the Fresnel screen.

4. An image display screen comprising:
   a Fresnel screen;
   a lenticular screen that widens a horizontal viewing angle of a light beam passing through the Fresnel screen; and
   a multifunctional screen disposed in front of the lenticular screen and comprising,
   a substrate sheet on the rear surface of which a predetermined pattern is formed that widens a vertical viewing angle of a light beam passing through the lenticular screen;
   a first portion integrated into a light incident surface of the substrate sheet facing the lenticular screen, wherein the first portion is a tinted light absorbing sheet preventing degradation of contrast due to an external light beam; and
   a second portion attached to the front surface of the substrate sheet that prevents scattering of the external light beam.

5. The image display screen of claim 4, wherein a plurality of cylindrical lenses, each having a predetermined curvature, are formed side by side in a horizontal direction on the rear surface of the substrate sheet.

6. The image display screen of claim 4, wherein the second portion is a reflection preventing film coated on the front surface of the substrate sheet.

7. The image display screen of claim 4, wherein a plurality of cylindrical lenses, each having a predetermined curvature, are formed side by side in a horizontal direction on the rear surface of the Fresnel screen.

8. A projection television comprising a screen on which an image is projected by an image forming device, the screen comprising:
   a Fresnel screen;
   a first lenticular screen that widens a horizontal viewing angle; and
   a second lenticular screen comprising a first portion that widens a vertical viewing angle and a second portion that prevents degradation of contrast due to external light;
   a protective screen;
   wherein a light emitting surface of the second lenticular screen and the protective screen are adhered to one another by an adhesive sheet;
   wherein the second portion has the same shape as a rear surface of the first portion; and
   wherein the second portion is a tinted light absorbing sheet which is adhered to a light incident surface of the second lenticular screen facing the first lenticular screen.

9. The projection television of claim 8, wherein the first portion is a substrate sheet comprising a plurality of cylindrical lenses, each lens having a predetermined curvature, formed side by side in a horizontal direction on a rear surface of the substrate facing the second portion.

10. The projection television of claim 8, wherein a plurality of cylindrical lenses, each lens having a predetermined curvature, are formed side by side in a horizontal direction on the rear surface of the Fresnel screen.

11. A projection television comprising a screen on which an image is projected by an image forming device, the screen comprising:
    a Fresnel screen;
    a lenticular screen that widens a horizontal viewing angle; and
    a multifunctional screen disposed in front of the lenticular screen and comprising,
    a substrate sheet on the rear surface of which a predetermined pattern is formed that widens a vertical viewing angle of a light beam passing through the lenticular screen;
    a first portion integrated into a light incident surface of the substrate sheet facing the lenticular screen, wherein the first portion is a tinted light absorbing sheet preventing degradation of contrast due to an external light beam; and
    a second portion attached to the front surface of the substrate sheet that prevents scattering of the external light beam.

12. The projection television of claim 11, wherein a plurality of cylindrical lenses, each lens having a predetermined curvature, are formed side by side in a horizontal direction on the back surface of the substrate sheet.

13. The projection television of claim 11, wherein the second portion is a reflection preventing film coated on the front surface of the substrate sheet.

14. The projection television of claim 11, wherein a plurality of cylindrical lenses, each lens having a predetermined curvature, are formed side by side in a horizontal direction on the rear surface of the Fresnel screen.

* * * * *